(12) United States Patent
Boxer et al.

(10) Patent No.: US 9,995,899 B2
(45) Date of Patent: Jun. 12, 2018

(54) MULTI-FIBER OPTICAL DISTRIBUTION CABLE FOR HALLWAY INSTALLATIONS

(71) Applicant: OFS FITEL, LLC, Norcross, GA (US)

(72) Inventors: Mark A Boxer, Pinetown, NC (US); Daniel Hendrickson, Roswell, GA (US); Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 56 days.

(21) Appl. No.: 14/844,410

(22) Filed: Sep. 3, 2015

(65) Prior Publication Data

US 2016/0299309 A1  Oct. 13, 2016

Related U.S. Application Data

(60) Provisional application No. 62/145,010, filed on Apr. 9, 2015.

(51) Int. Cl.
*G02B 6/44*  (2006.01)

(52) U.S. Cl.
CPC ......... *G02B 6/4466* (2013.01); *G02B 6/4436* (2013.01); *G02B 6/4482* (2013.01)

(58) Field of Classification Search
None
See application file for complete search history.

(56) References Cited

U.S. PATENT DOCUMENTS

| 9,151,919 | B2* | 10/2015 | Consonni | G02B 6/4433 |
| 9,435,977 | B2* | 9/2016 | Blazer | B29D 11/00663 |
| 2011/0075977 | A1* | 3/2011 | Register, III | G02B 6/4432 385/100 |
| 2013/0251321 | A1* | 9/2013 | Bradley | G02B 6/4411 385/113 |
| 2016/0116699 | A1* | 4/2016 | Larson | G02B 6/4466 385/102 |

* cited by examiner

*Primary Examiner* — Michelle R Connelly
(74) *Attorney, Agent, or Firm* — Law Offices of Leo Zucker

(57) ABSTRACT

An optical fiber distribution or breakout cable for serving multiple customer premises in a multi-dwelling unit (MDU) building. The cable contains a number of bend insensitive fibers each having a different colored coating for identification. A jacket of a flame-retardant polymer compound is extruded to surround the fibers. The jacket is sufficiently opaque to hide the color coated fibers at least partially from view, and the outer diameter of the jacket is not more than about 3.5 mm. A procedure for installing the cable through a hallway of a MDU building so as to lessen any negative visual impact of the installation on observers nearby is also disclosed.

10 Claims, 2 Drawing Sheets

MULTI-FIBER OPTICAL DISTRIBUTION CABLE FOR HALLWAY INSTALLATIONS

CROSS REFERENCE TO RELATED APPLICATION

Figure 1:
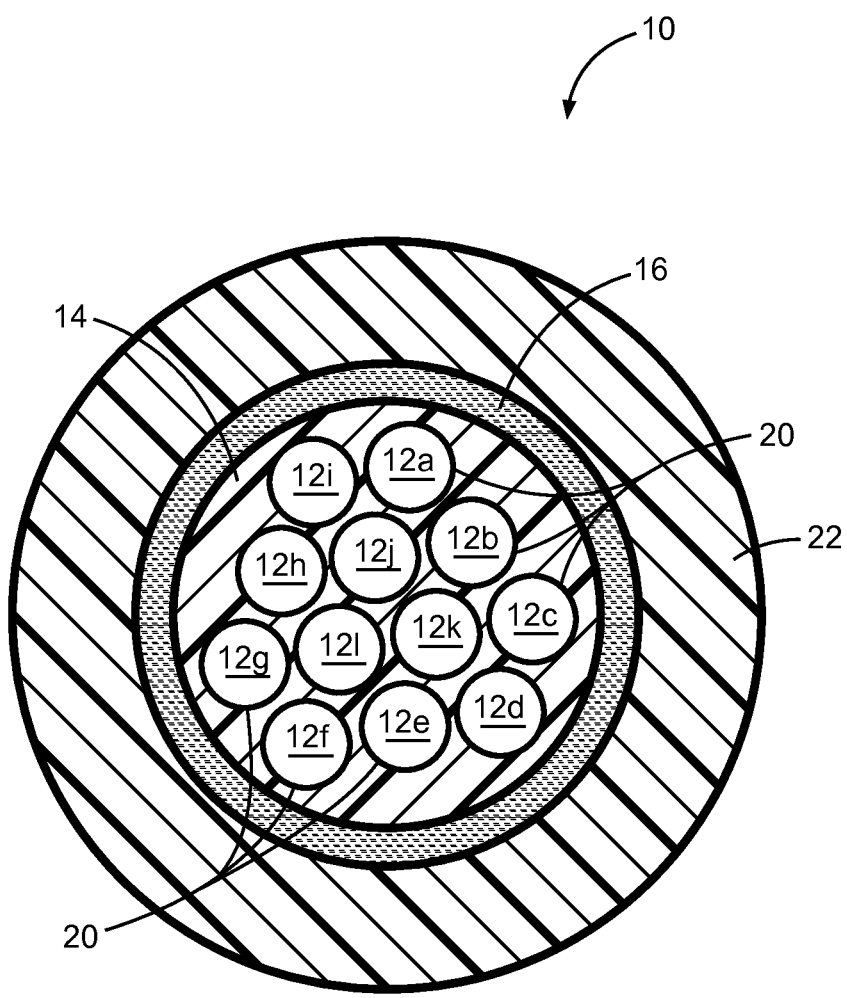

This application claims priority under 35 U.S.C. § 119(e) of U.S. Provisional Patent Application No. 62/145,010 filed Apr. 9, 2015, titled "Low Visual Impact Multi-Fiber Microcord," the entire contents of which are incorporated by reference.

BACKGROUND OF THE INVENTION

Field of the Invention

The present invention relates to communication cables, and particularly to optical fiber distribution cables for servicing a number of different customer living units or premises in a multi-dwelling unit (MDU) building.

Discussion of the Known Art

Increasing amounts of optical fiber cabling are being installed annually to satisfy demand for fiber-to-the-home (FTTH) communication services by customers occupying living units or other premises in multi-dwelling unit (MDU) buildings. The services typically include, inter alia, television, telephony, and Internet access. Recent advances in optical fiber and cable technology have facilitated such installations, particularly the development of ultra bend insensitive fibers (BIFs) such as, e.g., EZ-Bend® fiber available from OFS Fitel, LLC.

Notwithstanding, customers are increasingly sensitive to the visual impact of fiber cabling installations with respect to the immediate surroundings. In fact, potential customers will refuse installations only because the provider's cabling will have a negative visual impact. With the increasing availability of high bandwidth wireless services, cable service providers should ensure their installations will be virtually invisible to customers when completed.

Challenges remain with respect to routing multiple optical fibers through building hallways or passageways with minimal if any negative visual impact, and without adding costly moldings or trim to hide the fibers from open view. At present, one of two procedures is typically used.

In one procedure, a single distribution or "breakout" cable that contains multiple fibers within a common outer jacket or sheath, is adhered to a hallway wall over a path running next to or near each premises to be served by the fibers. Examples include MiniCord® and AccuPack® cables available from OFS Fitel, LLC. Once installed, the cables must be able to perform for more than 20 years, and comply with all applicable laws and codes pertaining to smoke and flammability. See, U.S. Pat. No. 7,720,338 (May 18, 2010), and Int. Pub. No. WO 2014/172285 (Oct. 23, 2014), both of which are incorporated by reference. In an installation procedure offered by 3M™ Company under the name "One Pass Pathways," the fibers are contained inside a PVC duct or tube on which an outer adhesive strip is provided to adhere the duct along hallway wall.

In the other procedure, a bundle of individual buffered fibers or small optical fiber cables are tied to one another at regular intervals over the length of the bundle, and fastened to a hallway wall either with or without the addition of special moldings to hide the buffered fibers or cables from open view. The individual fibers are typically identified by either color-coding or application of a print string. In this procedure, the individual glass optical fibers, typically about 250 microns or larger in diameter, must be contained within a buffer coating or a small cable structure to protect the relatively fragile glass and to ensure compliance with all applicable laws and codes pertaining to smoke and flammability.

Neither procedure is optimal, however. Typical distribution cables may be relatively thick compared to the diameters of the fibers they contain. For example, the outer diameter (O.D.) of a typical 12-fiber distribution cable in which each fiber has a 900 micron tight buffer layer, is around 5 to 6 mm. The O.D. of a distribution cable containing twelve 250 micron colored fibers is still around 3 to 4 mm. Therefore, the installed cables can still be noticed by observers nearby.

In addition, a tied bundle of fibers each having an O.D. as small as 900 microns or 1.2 mm, can also be noticed when routed along a hallway wall. As mentioned, each fiber in the bundle often has a different color so an installer can identify the fiber and connect it to a drop fiber from a designated living unit. Thus, in this case, all the colored fibers in the bundle will remain visible and contribute to the negative visual impact of the installation, especially if the bundle is routed over or near a lightly colored wall, ceiling, or molding. Even if the fibers within the bundle are all of the same color, they can have a negative visual impact on installation due to the uneven surface of the bundle, resulting in some surfaces being shadowed.

A system known as EZ-Bend InvisiLight®, available from OFS Fitel, LLC, allows a single drop fiber to be installed inside a living unit by use of a tool that routes and adheres a flame-retardant, plastic-coated 900 micron fiber along existing moldings at the premises, inside corners between ceilings and walls, and inside corners between walls and moldings, leaving the entire installation virtually invisible. See, U.S. Pat. No. 8,792,766 (Jul. 29, 2014), No. 8,574,385 (Nov. 5, 2013), and No. 8,906,178 (Dec. 9, 2014), all of which are incorporated by reference in their entireties.

In view of the above, there is still a need for an optical fiber distribution or breakout cable that contains fibers of different colors for easy identification, but which has little if any negative visual impact after the cable is routed and installed through a building hallway or passageway to service customers in the building.

SUMMARY OF THE INVENTION

According to the invention, an optical fiber distribution or breakout cable for servicing multiple customer units or premises in a multi-dwelling unit (MDU) building, includes a number of coated bend insensitive optical fibers each of which has a coating of a different color to identify the fiber. An outer jacket of a flame-retardant polymer compound is extruded to contain the coated fibers, and the jacket is sufficiently opaque to hide the colored fibers at least partially from view. The outer diameter of the jacket is not more than approximately 3.5 mm so that any negative visual impact of the cable is reduced or eliminated when the cable is installed over a routing path including a hallway wall to service the customer units or premises in the MDU building.

According to another aspect of the invention, a procedure for installing an optical fiber distribution or breakout cable for servicing customer units or premises in a multi-dwelling unit (MDU) building, includes providing a distribution or breakout cable containing a number of colored optical fibers each of which is assigned to a living unit or premises to be serviced by the cable, the cable having an opaque outer jacket with a diameter of not more than about 3.5 mm, identifying each living unit or premises to be serviced by the cable along a building hallway, and mounting a connection module at or near each unit. A routing path is determined for the cable which path includes a wall of the hallway, the cable is taped temporarily over the routing path, and coiled sections of cable are left at the mounted connection modules. An adhesive bead is applied over the routing path and the cable is pressed into the bead.

The coiled cable sections are placed in each connection module, the outer jacket on each cable section is opened, and a cable fiber assigned to the corresponding living unit is identified by the color of the fiber. A length of the identified fiber is removed and terminated with a first connector. The connector is inserted in an adapter mounted in the connection module, an end of a drop cable from the living unit is passed into the connection module, and a second connector at the end of the drop cable is inserted into the adapter.

For a better understanding of the invention, reference is made to the following description taken in conjunction with the accompanying drawing and the appended claims.

BRIEF DESCRIPTION OF THE DRAWING FIGURES

Figure 2:
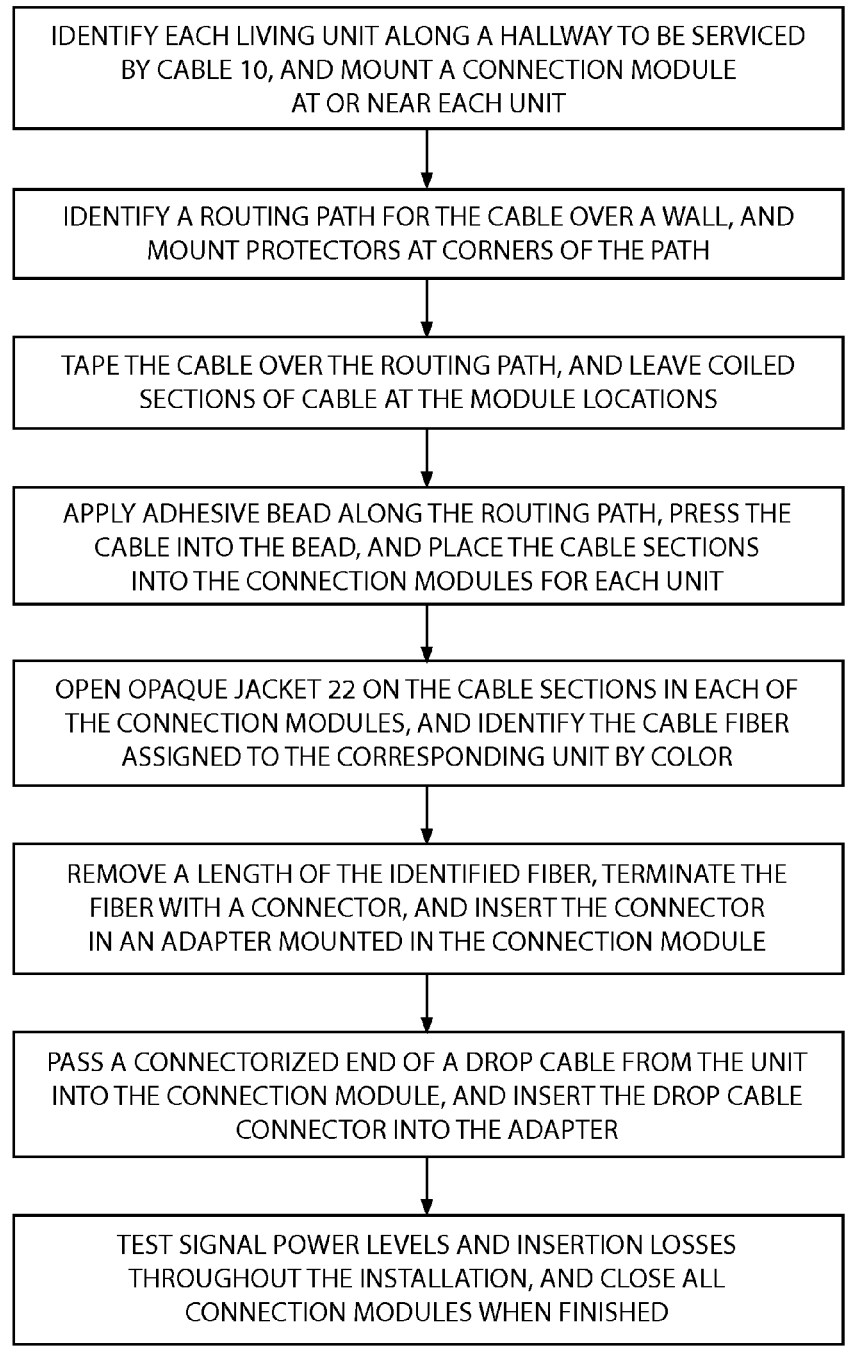

In the drawing:

FIG. 1 is a cross-sectional profile of an optical fiber distribution or breakout cable according to the invention; and FIG. 2 is a flow chart showing steps of a building hallway installation procedure for the cable of FIG. 1, according to the invention.

DETAILED DESCRIPTION OF THE INVENTION

FIG. 1 is a cross-sectional profile of an optical fiber distribution or breakout cable 10, according to the invention. As detailed below, the cable 10 is especially suitable for routing along a building hallway to service a number of living units or premises in a multi-dwelling unit (MDU) building, without having a negative visual or aesthetic impact on observers nearby. Persons skilled in the art may find the cable 10 to be particularly useful for other applications as well.

In the disclosed embodiment, the cable 10 contains twelve coated optical fibers 12a, 12b, ..., 12l each of which may be assigned to service a particular living unit in a MDU building. The fibers may include, for example, one or more of the earlier mentioned EZ-Bend® fibers each having a 125 micron diameter cladding and intended for both in-home and MDU building applications. The cladding is coated with a thermoset polymeric coating 20 made from UV-curable acrylate oligomers to an outer diameter (O.D.) of approximately 240 microns, and the coating is typically colored to identify each fiber when the fibers are contained in a multi-fiber cable like the cable 10. Cables that contain EZ-Bend® fibers can be routed around corners and deployed using traditional copper wire cabling techniques. Other fibers that are bend-insensitive and capable of providing communication services to customer premises may also be used in the cable 10.

The cable 10 has a relatively soft, curable inner layer 14 that surrounds the coated fibers 12a-12l, and a harder curable outer layer 16 that surrounds the inner layer 14. If the layers 14, 16 are cured by UV light, then the layers are preferably clear or translucent in order to allow enough UV energy to pass through them for curing during manufacture of the cable 10. The O.D. of the outer layer 16 in the cable 10 is approximately 1.35 mm. Further details of the layers 14, 16 are disclosed in the earlier mentioned U.S. Pat. No. 7,720,338 and are incorporated by reference.

As mentioned, each one of the cable fibers 12a to 12l has a coating 20 of a different color so an installer can identify the fiber, and then connect it to a living unit to which the fiber has been assigned. The colors of the coatings on the twelve fibers should comply with industry color standards such as TIA-598, namely; blue, orange, green, brown, slate, white, red, black, yellow, violet, rose, and aqua.

If the layers 14, 16 are clear or translucent for the purpose of accepting light energy to cure the layers, then the colored coatings 20 of the fibers 12a to 12l will be visible through the outer layer 16. Thus, according to the invention, the cable 10 is provided with an outer jacket 22 of a mineral filled, at least partially opaque flame-retardant polymer compound, for example, by pressure extruding a 0.35 mm thick layer of the compound at a melt temperature of approximately 350° F. over the cured clear outer layer 16. The jacket 22 not only hides the colored coatings 20 on the cable fibers 12a-12l from view, but also makes the cable 10 flame retardant to meet regulations of various countries pertaining to the composition of materials in communication cables.

The polymer compound for the jacket 22 is selected to conform to local fire safety standards, for example, type OFN non-conductive, type OFNG non-conductive general purpose, or type OFNR non-conductive riser in the U.S.A.; or EN 13501-6 Euroclass E for the European Union. An example of a compound that meets present standards in the United States is SmokeGuard IV 1320, which is a low-smoke PVC compound containing aluminum trihydrate manufactured by AlphaGary Corporation, Leominster, Mass., USA. An example of a low-smoke zero-halogen material that could meet present Euroclass requirements is Megolon 8142-NT, a compound containing magnesium hydroxide filler, also manufactured by AlphaGary Corporation.

It has been found that a thickness of only 0.2 mm for the jacket 22 of the 12-fiber cable 10 will enable the cable to meet the type OFN fire safety requirements, allowing the cable 12 to have an O.D. of only about 1.75 mm. To meet the type OFNR or FT-4 safety requirements, however, a jacket thickness of approximately 0.75 mm may be required, with a cable O.D. of about 2.85 mm. Smaller diameter cables containing only four, six, or eight fibers can also be provided.

Other possible PVC compounds for the cable jacket 22 include AlphaGary SmokeGuard™ III 1011E which is believed to contain between 15 and 25% aluminum trihydrate filler by weight, and Teknor Apex FireGuard™ 910 A18, also believed to contain between 15 and 25% aluminum trihydrate filler by weight.

Other low-smoke zero-halogen compounds for the jacket 22 include AlphaGary Megolon™ 8142 NT which is believed to contain between 60 and 70% magnesium hydroxide by weight, and PolyOne ECCOH™ 6638, also believed to contain between 60 and 70% magnesium hydroxide by weight.

Hydrate mineral fillers such as aluminum trihydrate $Al(OH)_3$ or magnesium hydroxide $Mg(OH)_2$ are both used in concentrations ranging from approximately 10% to 70% by weight to increase the flame retardancy of plastics materials. Upon exposure to fire, the mineral filled materials emit water vapor. Other mineral fillers, such as calcium carbonate or clay can also be used to reduce cost. An additional benefit of mineral fillers is that they provide opacity to the cable jacket 22. Other pigments can be added to impart specific colors, for example, titanium oxide $TiO_2$ will impart a bright white color to the cable jacket 22 and allow the cable 10 to blend into or color match a like-colored surface over which the cable is routed. Other pigments or colorants may be used to reduce or eliminate any negative visual impact of the cable 10 when bonded to a colored hallway wall or other openly visible interior building surface.

In addition, local fire safety codes often require that cabling be marked with a printed legend to indicate its fire safety rating. Any printing on the cable jacket 22 could make the cable more noticeable when installed, however. Accordingly, in a preferred embodiment, the cable jacket 22 is marked by an inked string of text not more than about 1.34 mm high, and lightly colored, e.g., silver or gray. Thus, the text string can only be seen and read when viewed relatively close by a fire marshal, and remain unnoticed at a distance.

The cable jacket 22 should be capable of bonding via a suitable non-toxic adhesive to common wall or other interior structural surfaces, for example, painted or unpainted wood, paneling, sheetrock, lath and plaster, concrete block, brick, stucco, wallpaper, and texturing. Also, for the first 10 to 20 minutes after the cable 10 is bonded to an underlying surface, an installer must be able to reposition the cable if necessary in order to correct a mistake or to accommodate variations from the initially determined routing path.

EXAMPLE

FIG. 2 shows an example of a hallway installation procedure for the cable 10 inside a MDU building, including the connection of the cable fibers to corresponding living units or premises along the hallway.

1. Identify all the living units or premises to be serviced by the cable 10. For each premises, determine a location on a wall of the hallway where a connection module can be mounted next to or near the premises, and secure the module in place. The module should be mounted as close as possible to the hallway ceiling, and overlie an opening through which an end of a terminated drop fiber can pass from inside the premises to enter the module. The connection module can be mounted either above the door of the living unit in the hallway, or, alternatively, inside the living unit near the door. To facilitate safe and fast wall penetrations, the module should not be mounted in the vicinity of a wall stud, or over wiring known to be present inside the wall.

2. Identify a routing path along the hallway wall over which the cable 10 is to be permanently installed, and wipe the path with a clean cloth. A corner protector should be mounted over each corner along the path. To blend with the environment and reduce visibility, the cable 10 can be routed inside corners of ceilings and walls, ceilings and crown moldings, walls and crown moldings, and walls and door moldings. The path can also include a vertical corner formed by adjacent walls.

3. If necessary, pull and/or blow the cable 10 through a riser micro-duct that may be pre-installed.

4. Secure a free end of the cable 10 as supplied on a spool, and pay out and temporarily tape the cable along the identified routing path. Leave a one meter (approx. three foot) coiled section of the cable 10 at the determined location of each connection module along the path.

5. Starting from the end of the routing path closer to the fiber network, apply a small bead of an engineered adhesive along the path, and press the cable 10 into the adhesive bead. Alternatively, the cable 10 may be pressed into the adhesive starting from the premises end of the path if easier than from the network end. The coiled cable sections are placed directly inside the connection modules at each living unit for those modules mounted on the hallway wall. For modules mounted inside a living unit, the associated cable section is looped and passed through a pre-installed tube to enter the living unit, and the section is placed inside the module there. The foregoing is repeated until all the coiled sections of the cable 10 are placed in the connection modules for all of the units to be serviced.

6. Connect each cable fiber to its assigned living unit by cutting into the opaque cable jacket 22 of the coiled cable section inside the unit's connection module, and exposing the clear layers 14, 16 through which each of the differently colored fibers 12a to 12l will be visible. Identify the assigned cable fiber, remove a length of the fiber from the cable section, and splice a connector on the free end of the fiber. Plug the fiber connector into one end of an adapter which may be supplied together with the module, and plug the connector at the end of the unit's drop cable into the opposite end of the adapter.

7. Test the entire installation for acceptable optical signal power levels and insertion losses using known test standards and equipment. Once the overall installation is determined to be operating properly, all the connection modules should be kept closed.

While the foregoing represents preferred embodiments of the present invention, it will be understood by persons skilled in the art that various changes, modifications, and additions can be made without departing from the spirit and scope of the invention. For example, as disclosed herein, the cable 10 contains twelve fibers. Other embodiments of the cable may have higher or lower fiber counts to accommodate installations of various scales and routing configurations. Accordingly, the invention includes all such changes, modifications, and additions as are within the bounds of the following claims.

We claim:

1. An optical fiber distribution or breakout cable for servicing multiple living units or premises inside a building, consisting of:

an outer jacket;

a number of bend insensitive optical fibers each of which has a coating of a different color to identify the fiber;

a relatively soft curable inner layer surrounding the coated fibers, and a harder curable outer layer surrounding the soft curable inner layer;

wherein the inner and the outer layers are clear or translucent to allow a sufficient amount of light energy to pass through the layers to cure the layers during manufacture of the cable, and to allow the differently colored coatings on the optical fibers to be visible through the layers so that an optical fiber assigned to a given living unit or premises can be identified by the color of the coating on the fiber when the outer jacket of the cable is removed;

the outer jacket consists of a flame-retardant polymer compound that is extruded over the outer layer when cured, wherein the jacket is not more than approximately 0.75 mm thick and sufficiently opaque to hide the colored coatings on the optical fibers at least partially from view, and the jacket has an outer diameter of not more than approximately 3.5 mm so that any negative visual impact of the cable is reduced or eliminated when the cable is routed over a hallway wall or other interior building surface to service the living units or premises; and the polymer compound forming the outer jacket is compatible with a non-toxic adhesive that has been applied along the hallway wall or other interior building surface and into which adhesive the cable is pressed.

2. An optical fiber cable according to claim 1, wherein each of the coated optical fibers has an outer diameter of approximately 240 microns.

3. An optical fiber cable according to claim 1, wherein the flame-retardant polymer compound forming the outer jacket is a low-smoke PVC compound.

4. An optical fiber cable according to claim 1, wherein the flame-retardant polymer compound forming the outer jacket includes a low-smoke zero-halogen material.

5. An optical fiber cable according to claim 1, wherein the flame-retardant polymer compound forming the outer jacket has a mineral filler selected from among magnesium hydroxide $Mg(OH)_2$ and aluminum trihydrate $Al(OH)_3$ in a concentration ranging from approximately 10% to 70% by weight.

6. An optical fiber cable according to claim 1, wherein the flame-retardant polymer compound forming the outer jacket has a mineral filler selected from among calcium carbonate and clay.

7. An optical fiber cable according to claim 1, wherein the flame-retardant polymer compound forming the outer jacket has a pigment or colorant for blending or color matching the cable to a wall or other surface along which the cable is installed.

8. An optical fiber cable according to claim 1, wherein the outer jacket is marked with a printed legend to indicate a fire safety rating for the cable.

9. An optical fiber cable according to claim 8, wherein the printed legend comprises an inked string of lightly colored text not more than about 1.34 mm high so that the text string can be seen and read only when viewed at a relatively close distance.

10. An optical fiber cable according to claim 1, wherein the diameter of the curable outer layer that surrounds the curable inner layer in the cable is approximately 1.35 mm.

* * * * *